United States Patent

Bakhti et al.

Patent Number: 5,818,987
Date of Patent: Oct. 6, 1998

[54] FILTER OBTAINED BY WRITING A BRAGG GRATING INTO AN OPTICAL FIBER

[75] Inventors: Fatima Bakhti; Isabelle Riant; Pierre Sansonetti, all of Palaiseau, France; François Gonthier, Montreal, Canada

[73] Assignee: Alcatel Alsthom Compagnie Generale d'Electricite, Paris, France

[21] Appl. No.: 808,862

[22] Filed: Feb. 28, 1997

[30] Foreign Application Priority Data

Mar. 1, 1996 [FR] France ................................ 96 02620

[51] Int. Cl.⁶ .............................. G02B 6/26; G02B 6/34
[52] U.S. Cl. ................................. 385/28; 385/37
[58] Field of Search ................... 385/37, 10, 28, 385/43, 14, 12, 123; 372/6, 69, 102; 359/286, 305, 314, 566, 569, 573, 900

[56] References Cited

U.S. PATENT DOCUMENTS

| | | | |
|---|---|---|---|
| 5,319,435 | 6/1994 | Melle et al. | 250/227.18 |
| 5,384,884 | 1/1995 | Kashyap et al. | 385/129 |
| 5,619,603 | 4/1997 | Epworth et al. | 385/37 |
| 5,633,965 | 5/1997 | Bricheno et al. | 385/37 |
| 5,671,307 | 9/1997 | Lauzon et al. | 385/37 |
| 5,717,799 | 2/1998 | Robinson | 385/37 |
| 5,718,738 | 2/1998 | Kohnke et al. | 65/31 |

FOREIGN PATENT DOCUMENTS

| | | |
|---|---|---|
| 1149209 | 7/1983 | Canada . |
| 0211582A2 | 2/1987 | European Pat. Off. . |
| WO9110148 | 7/1991 | WIPO . |

OTHER PUBLICATIONS

Chao–Xiang Shi et al, "Mode Conversion Based on the Periodic Coupling by a Reflective Fiber Grating", *Optics Letters*, vol. 17, No. 23, 1 Dec. 1992, pp. 1655–1657.

F. Bilodeau et al, "Efficient, Narrowband LP01 LP02 Mode Convertors Fabricated in Photosensitive Fibre: Spectral Response", *Electronics Letters*, vol. 27, No. 8, 11 Apr. 1991, pp. 682–684.

S. J. Hewlett et al, "Cladding–Mode Coupling Characteristics of Bragg Gratings in Depressed–Cladding Fibre", *Electronics Letters*, vol. 31, No. 10, 11 May 1995, pp. 820–822.

*Primary Examiner*—Akm E. Ullah
*Attorney, Agent, or Firm*—Sughrue, Mion, Zinn, Macpeak & Seas, PLLC

[57] ABSTRACT

An optical filter is formed by writing at least one long-period Bragg array into an optical fiber which is tapered to define two substantially adiabatic transition areas delimiting an intermediate area in which the long-period Bragg grating is written to produce codirectional coupling between two guided modes in the intermediate area at a wavelength that is a function of the period of the grating.

2 Claims, 2 Drawing Sheets

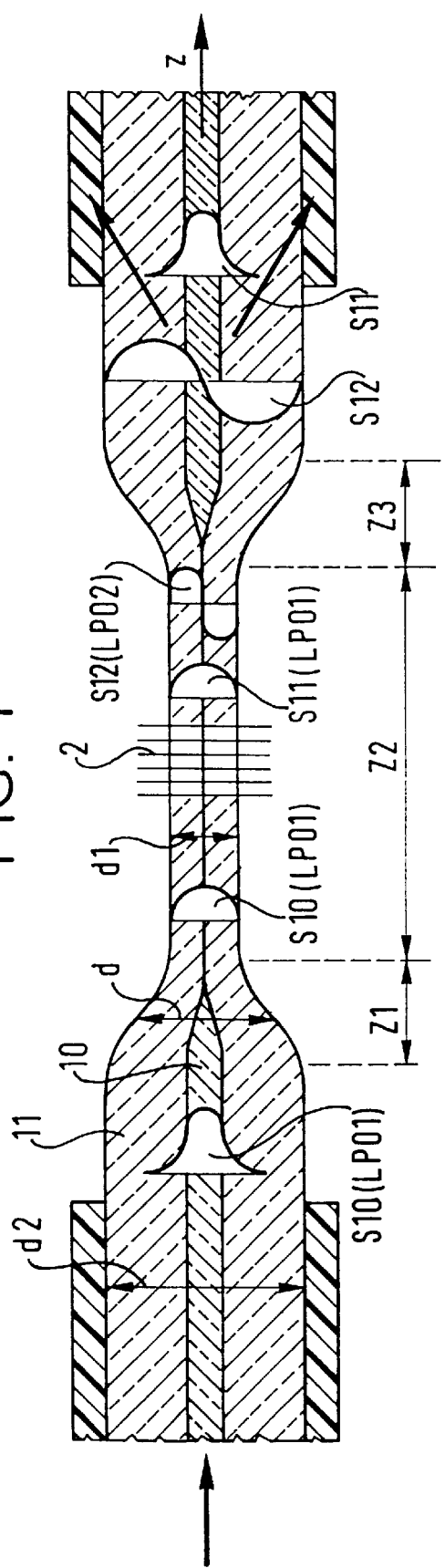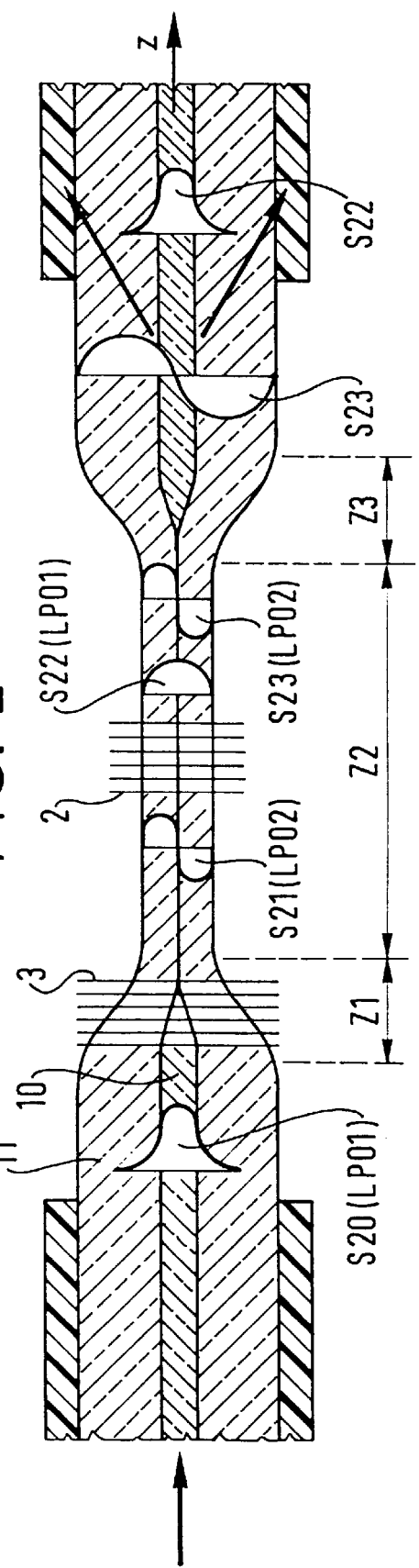

FILTER OBTAINED BY WRITING A BRAGG GRATING INTO AN OPTICAL FIBER

BACKGROUND OF THE INVENTION

1. Field of the Invention

The present invention is generally concerned with optical filters. The invention is more particularly concerned with band rejection and band-pass filters.

2. Description of the Prior Art

As will emerge more clearly in the remainder of the description, at least one photorefractive grating or Bragg grating written into an optical fiber is used to implement the invention. The writing of a Bragg grating into an optical fiber relies on the basic principle of varying the refractive index of the fiber core, which is typically doped with germanium, by U.V. illumination, as described in American patent U.S. Pat. No. 4,474,427. In the prior art, a holographic technique as described in document U.S. Pat. No. 4,725,110 or a point by point technique as described in patent U.S. Pat. No. 5,104,209 or a phase mask technique as described in U.S. Pat. No. 5,367,588 is used to perform this writing, for example.

The document "Long-period fiber gratings as band-rejection filters" by A. M. VENGSARKAR et al. published in OFC'95, PD4, (1995), describes a band rejection optical filter in the form of a long-period Bragg grating, the period being in the hundreds of microns, written into an optical fiber from which the coating is locally removed. The period of the grating is such that the fundamental mode guided in the core of the fiber is coupled at a given wavelength to a cladding mode which is thereafter attenuated rapidly as it propagates in the cladding because of losses at the cladding-coating interface. As the coupling occurs at a given wavelength, dependent on the period of the grating, the Bragg grating written into the fiber behaves as a band rejection filter.

The main drawback of the embodiment described in the above document is imperfect coupling between core and cladding modes, which results from the small cross-section of the core of the fiber, a sensitivity to the Bragg wavelength that is a priori five times greater than the sensitivity in a conventional short-period Bragg grating, and the presence of a plurality of cladding modes.

SUMMARY OF THE INVENTION

The invention is directed to remedying this drawback by providing an optical filter formed by writing at least one long-period Bragg array into an optical fiber which is tapered to define two substantially adiabatic transition areas delimiting an intermediate area in which said long-period Bragg grating is written to produce codirectional coupling between two guided modes in said intermediate area at a wavelength that is a function of the period of said grating.

The invention also provides a band-pass optical filter that differs from the above band rejection filter in that it further comprises a second Bragg grating written into that of said two transition areas that is disposed at the input at which an optical signal is received.

Other features and advantages of the present invention will become more apparent upon reading the following description given with reference to the corresponding accompanying drawings.

BRIEF DESCRIPTION OF DRAWINGS

FIG. 1 shows diagrammatically a band rejection filter of the invention in the form of a Bragg grating written into a tapered optical fiber, together with the various modes propagating in the fiber.

FIG. 2 shows diagrammatically a band-pass filter of the invention in the form of two Bragg gratings written into a tapered, initially monomode optical fiber, together with the various modes propagating in the fiber.

DETAILED DESCRIPTION OF THE PREFERRED EMBODIMENTS

FIG. 1 shows a tapered optical fiber with an axis z for implementing filters in accordance with the invention. The values of z increase along the axis z from left to right. A tapered optical fiber of this kind is obtained, for example, by melting and tapering a monomode optical fiber comprising a core 10 and a cladding 11 as described in the article "Filtrage spectral par fibres unimodales effilées—Application aux coupleurs WDM" ("Spectral filtering using tapered monomode fibers—Application to WDM couplers"), by Jacques Bures et al. published in "OPTO'89, pp 75–78, Esi-Publi". Heating and tapering the fiber varies its diameter to define three successive areas Z1, Z2 and Z3, namely two transition areas Z1 and Z3 and an intermediate area Z2, the two transition areas Z1 and Z3 lying one on each side of the intermediate area Z2. In the transition area Z1 the diameter d of the fiber decreases as a function of z from a diameter equal to the diameter d2 of the fiber to a diameter equal to a minimal diameter d1. The intermediate area Z2 has the minimal diameter d1 over all of its length. In the second transition area Z3 the diameter of the fiber increases as a function of z from a diameter equal to the minimal diameter d1 to the diameter d2 of the fiber. Consequently, the diameter of the core 10 of the fiber varies and is virtually zero in the intermediate area Z2. The slope of the variation of the diameter d of the fiber as a function of z in the transition areas Z1 and Z3 is sufficiently small to satisfy the adiabatic criterion, as explained in the article mentioned above and in the document "Tapered single-mode fibers and devices" by J.D. LOVE et al. published in "IEE Proceedings-J, vol. 138, N°5, October 1991". A region is adiabatic if the coupling between modes due to the slope of the fiber is low or negligible. In other words, a core mode (LP01) propagating in the monomode fiber continues to propagate in the form of an LP01 mode after passing through the area Z1, without giving rise to any other mode.

In accordance with the invention, to produce a band rejection filter a long-period Bragg grating 2 is written into the intermediate area Z2 of the tapered fiber. It is assumed that this intermediate area Z2 can be written with a Bragg grating, for example because the cladding 11 is doped with germanium. The long-period Bragg grating is of the type described in the previously mentioned article "Long-period fiber gratings as band-rejection filters" by A.M. VENGSARKAR et al. published in OFC'95, PD4, (1995).

Figure 3:
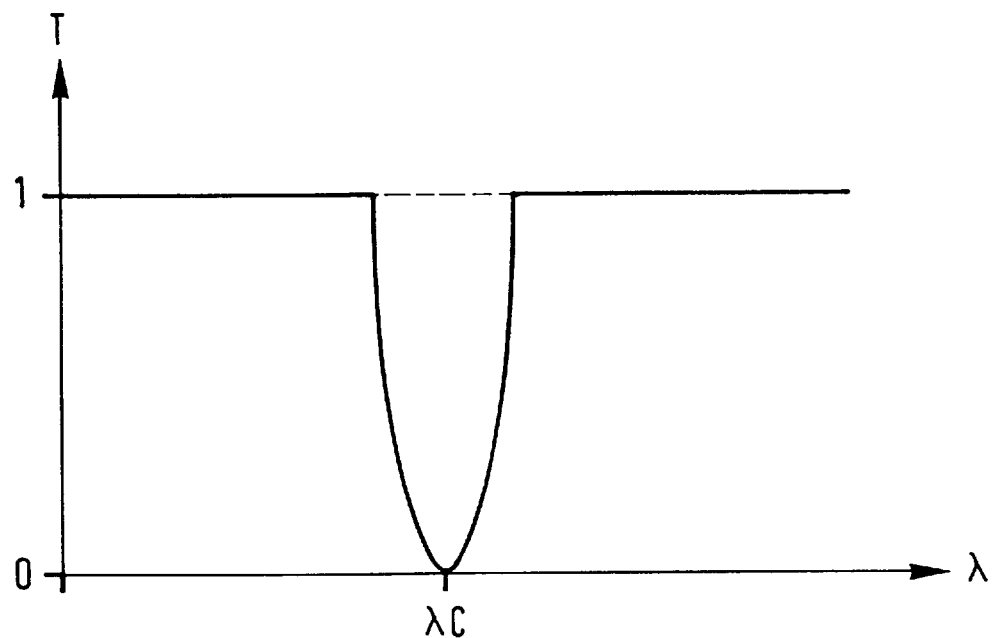
FIGS. 3 and 4 show transmission spectra respectively obtained with the band rejection and band-pass filters shown in FIGS. 1 and 2.

The optical phenomena operative in the embodiment described above are as follows. In FIG. 1, it is supposed that the incoming optical signal S10 propagates in the direction of increasing z in the monomode fiber. The tapered part Z1-Z2-Z3 of the fiber receives this incoming optical signal S10 propagating in LP01 mode, or core mode, and having a Gaussian type spatial distribution. The LP01 mode optical signal S10 crosses the adiabatic transition area Z1 without giving rise to other modes. It therefore continues to propagate in the intermediate area Z2 in the LP01 mode, not in the core 10 of the fiber, but in the cladding 11, the core being substantially non-existent in the intermediate area Z2. The long-period Bragg grating 2 introduces codirectional coupling between the LP01 mode and a guided LP02 mode in the area Z2, at a wavelength which is a function of the period of the grating 2. As the intermediate area Z2 has a diameter greater than the diameter of the core 10, the coupling obtained is more efficient that that obtained in a fiber core if the long-period grating is written into a non-tapered optical fiber. This coupling gives rise to an LP01 mode signal S11 derived directly from the signal S10 and an LP02 mode signal S12 that conveys the power of the incoming optical signal at the coupling wavelength. As shown by the two arrows on the righthand side of FIG. 1, after entering the area Z3 the LP02 mode signal S12 is attenuated in proportion to the distance traveled as the result of losses at the cladding-coating interface in the monomode fiber part. Only the LP01 mode signal S11 propagates durably in the core of the fiber, having a rejection band centered on the coupling wavelength $\lambda C$ which is a function of the period of the grating 2, as shown in FIG. 3. In practice, the period $\Lambda$ of the grating must satisfy the following phase tuning equation:

$$\beta_1 - \beta_2 = 2 \cdot \pi / \Lambda,$$

where $\beta_1$ and $\beta_2$ are the respective propagation constants of the LP01 and LP02 modes. As the values of the constants $\beta_1$ and $\beta_2$ are relatively similar, the period $\Lambda$ is relatively long, in the order of a few hundred microns for wavelengths in the order of 1 $\mu$m.

Referring to FIG. 2, a band-pass filter of the invention differs from the band rejection filter shown in FIG. 1 in that it further comprises a second Bragg grating 3 written into the transition area Z1 at the input receiving the optical signal S20.

The additional Bragg grating 3 is written into the transition area Z1 of the fiber that is at the input receiving the optical signal. The effective index neff of the fiber in the area Z1 decreases as a function of z. Writing the grating into an area Z1 of this kind therefore leads to coupling between the LP01 and LP02 modes over a wide bandwidth. As a result, an incoming LP01 mode optical signal S20 is coupled with an LP02 mode optical signal S21 over substantially all of the bandwidth of the incoming optical signal. Because the coupling occurs over a very wide band, it may be assumed that only the LP02 mode signal S21 is delivered at the output of the grating 3.

Figure 4:
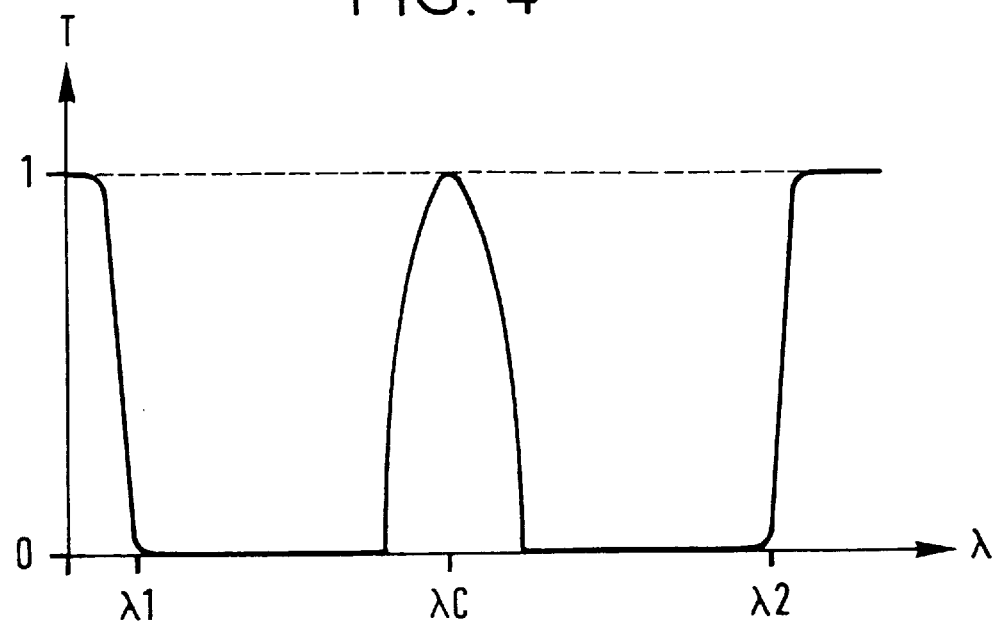

In the area Z2, the long-period Bragg grating 2 receives the LP02 mode signal S21 and introduces codirectional coupling between this LP02 mode and an LP01 mode at a wavelength that is a function of the period of the grating 2. This coupling gives rise to an LP02 mode signal S23 derived directly from the signal S21 and an LP01 mode signal S22 that conveys the power of the incoming optical signal S20 at the coupling wavelength. As shown by the two arrows on the righthand side of FIG. 2, the LP02 mode signal S23 is attenuated in proportion to the distance traveled by losses at the cladding-coating interface in the monomode part of the fiber. Only the LP01 mode signal S22 therefore continues to propagate in the core of the fiber, having a pass-band centered on the coupling wavelength, which is a function of the period of the grating 2, as shown in FIG. 4. The rejection band [$\lambda 1, \lambda 2$] corresponds to the bandwidth of the grating 3.

There is claimed:

1. An optical filter formed by writing at least one long-period Bragg array into an optical fiber which is tapered to define two substantially adiabatic transition areas delimiting an intermediate area in which said long-period Bragg grating is written to produce codirectional coupling between two guided modes in said intermediate area at a wavelength that is a function of the period of said grating.

2. An optical filter as claimed in claim 1 wherein a second Bragg grating is written into that of said two transition areas that is disposed at the input receiving an optical signal.

* * * * *